United States Patent [19]

Shinaver

[11] 4,456,529
[45] Jun. 26, 1984

[54] FILTER DEVICE FOR DIESEL ENGINES

[75] Inventor: Lawrence P. Shinaver, Ceres, Calif.

[73] Assignee: Applied Diesel Engineering, Inc., San Francisco, Calif.

[21] Appl. No.: 435,721

[22] Filed: Oct. 21, 1982

[51] Int. Cl.³ .............................................. B01D 27/08
[52] U.S. Cl. .................................... 210/306; 210/313; 210/436; 210/440; 210/450; 210/456
[58] Field of Search ............... 210/304, 305, 306, 313, 210/436, 440, 443, 450, 472, 456

[56] References Cited

U.S. PATENT DOCUMENTS 3,322,280  5/1967  Taylor ............................ 210/313 X
4,298,465  11/1981  Druffel ............................ 210/304

Primary Examiner—John Adee
Attorney, Agent, or Firm—Limbach, Limbach & Sutton

[57] ABSTRACT

A filter apparatus is disclosed for separating fluids of different densities. The apparatus has a relatively small housing size such that it is particularly suited for installation in passenger vehicles. The construction of the subject filter is intended to eliminate sealing problems found in the prior art as well as to permit the utilization of a filter having increased capacity.

13 Claims, 5 Drawing Figures

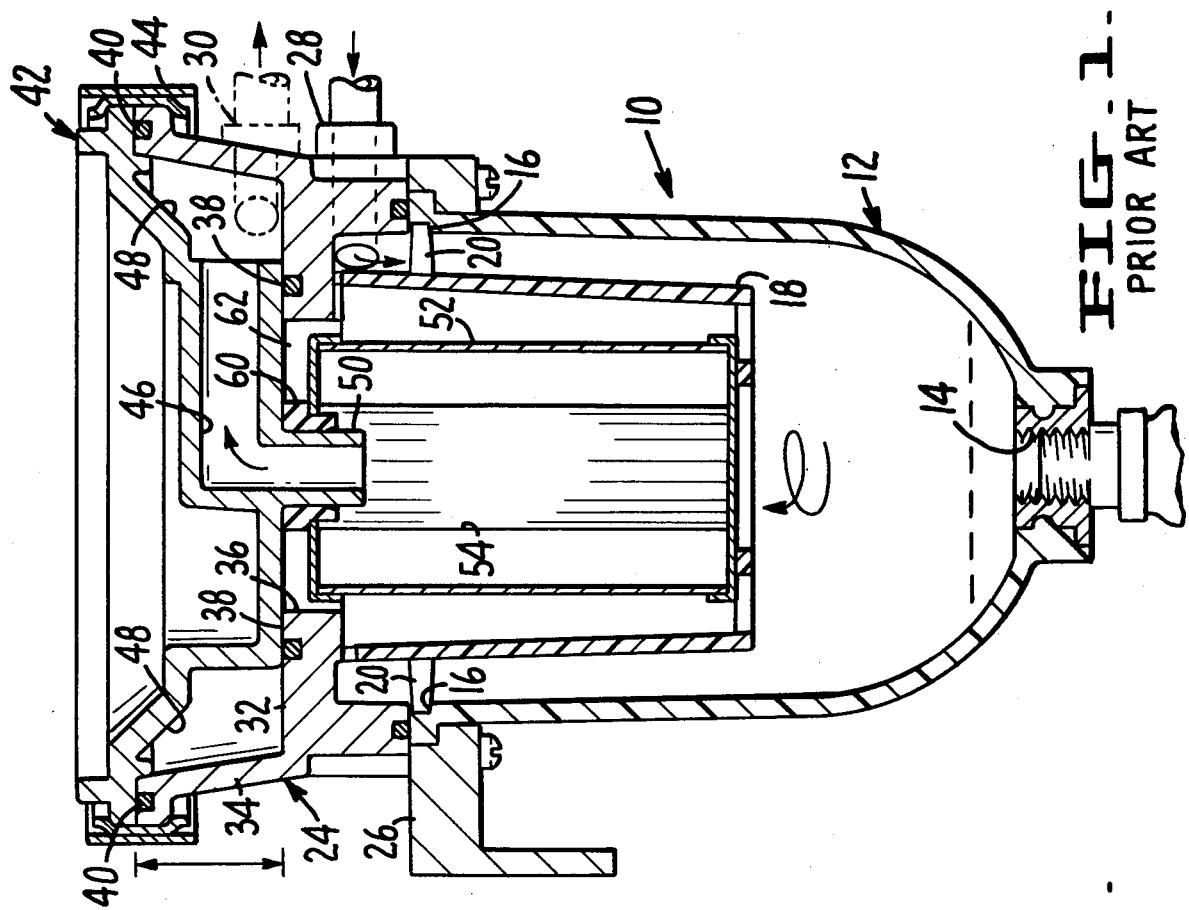
FIG_1.
PRIOR ART
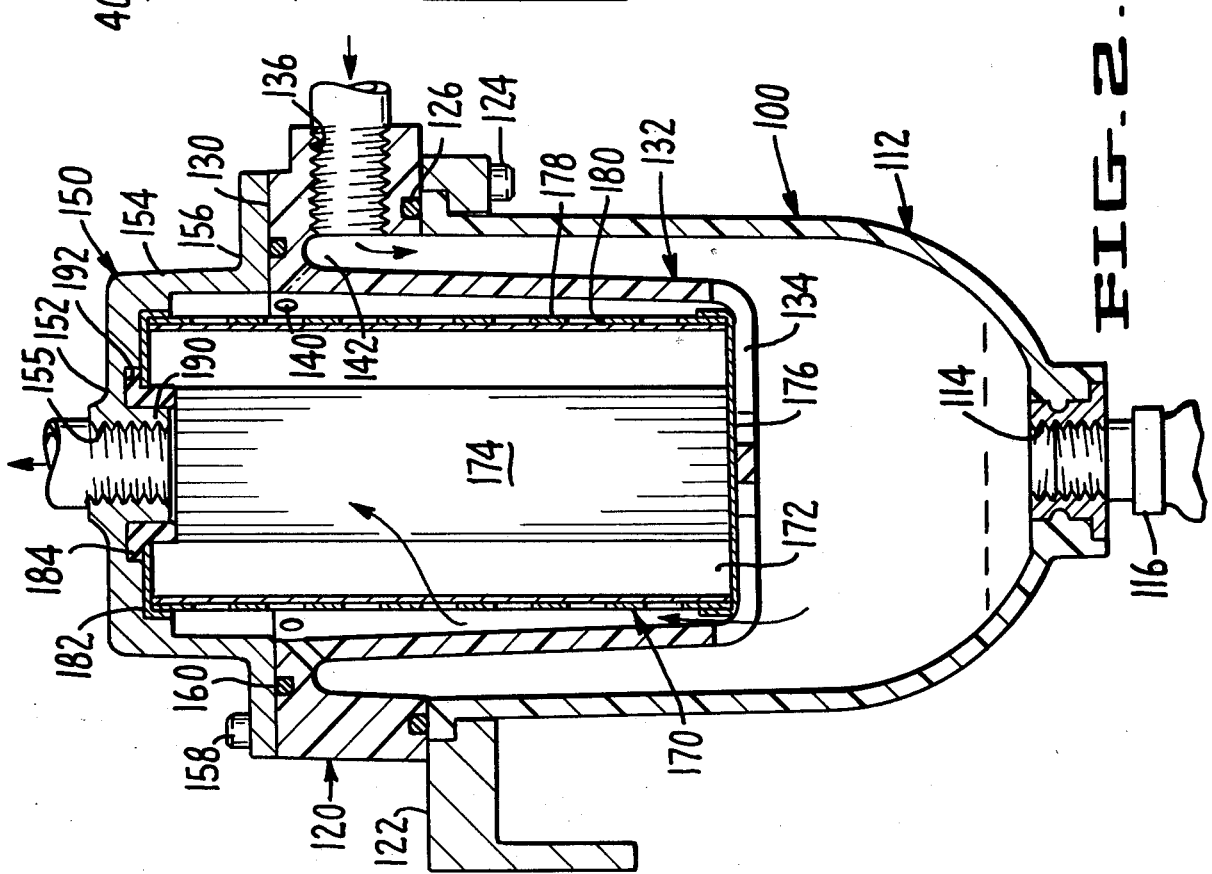
FIG_2.

FILTER DEVICE FOR DIESEL ENGINES

DESCRIPTION

1. Technical Field

The subject invention relates to a new and improved fluid filter device. The subject filter is particularly adapted for use in automotive diesel engines and is capable of separating water from the diesel fuel flow. The apparatus provides added filtration capabilities and incorporates a unique configuration which enhances fluid sealing.

2. Background Art

In the prior art, a variety of filtration systems have been developed for use with diesel engines. Unlike a typical gasoline engine, an engine operating with diesel fuel is particularly sensitive to the presence of water in its fuel supply. Therefore, various mechanisms have been developed which are intended to remove a large percentage of water from the fuel in order to improve the operating efficiency of the engine.

One example of such a filter device can be found in U.S. patent application No. 417,692, filed Sept. 13, 1982, and assigned to the same assignee as the subject invention. The filter disclosed in the latter application is primarily intended for use with larger vehicles, such as trucks. Therefore, the filter device is provided with a large capacity to withstand long hours of constant use. As can be appreciated, in order to provide a device with sufficient capacity, the outer envelope dimensions of the device are relatively large. In most trucks, there is usually sufficient room to install a larger filter device. However, in relatively smaller passenger automobiles, room in the engine compartment is severely limited. Therefore there is considerable interest in developing an effective fuel filter device having an outer envelope size which can be readily installed in smaller vehicles.

There is at least one known filter available in the prior art which has a relatively smaller envelope size. The smaller envelope size permits the filter to be installed in the often crowded engine compartment of a passenger automobile. Unfortunately, the prior art filter apparatus has a number of shortcomings which will be described in detail below.

As discussed in the earlier cited U.S. patent application, many known fuel filters rely on two principal stages for separating fluids. The first stage is defined by an open chamber area which allows heavier density fluids to separate from the lighter density fluids via gravity. The second stage typically includes a cartridge having a filter element through which the fuel flow is passed. The filter element functions to remove water molecules as well as particulates from the fuel flow.

The operating efficiency of the filter is in part dependent upon the size of the sediment chamber as well as the size of the filter element. As can be appreciated, when the outer envelope dimensions of the device are reduced to permit the apparatus to be used in smaller vehicles, the size of the sediment chamber and filter element must be correspondingly reduced. This reduction can adversely affect efficiency. More importantly, when the filter element is reduced in size, it will tend to become saturated and clogged at more frequent intervals. When the filter becomes clogged, it impedes the fuel flow and can sometimes result in large clumps of particulates or water being entrained in the fuel flow producing irregularities in the running of the engine. To alleviate this problem, it is necessary to change the filter relatively frequently. Accordingly, it would be desirable to provide an improved filter device having a filter element of increased capacity while maintaining the reduced dimensions of the outer envelope associated with the prior art small filter device.

Another shortcoming associated with the known prior art filter relates to the sealing structure. The prior art device, which will be described in detail below, has a stepped, bi-level seal design for closing the top of the filter. To prevent leakage, the components defining the bi-level seal design must be fabricated with a high degree of accuracy. This need for such accuracy is costly. Further, even when accurately machined, there still can be leakage.

Another problem associated with the filters of the prior art concerns the formation of air pockets. More particularly, air pockets will tend to form in gaps or open areas which are located adjacent the upper portions of the filter. In operation, the air pockets often become entrained in the fuel flow, causing the engine to cough or sputter. Therefore it would be desirable to develop an improved design which eliminates the likelihood of the formation of air pockets.

Accordingly, it is an object of the subject invention to provide a new and improved apparatus for separating fluids of different densities.

It is another object of the subject invention to provide a new and improved filter apparatus which has a relatively small envelope size.

It is a further object of the subject invention to provide a new and improved filter apparatus which has increased filtration capacity while maintaining a small envelope size.

It is still another object of the subject invention to provide a filter apparatus having a new and improved design which enhances the sealing between detachable members.

It is still a further object of the subject invention to provide a filter apparatus wherein the filter element is mounted in a manner to prevent the formation of air pockets.

DISCLOSURE OF THE INVENTION

In accordance with these and many other objects, the subject invention consists of a filter device for separating low density fluids from higher density fluids. The device has a relatively small envelope size yet provides enhanced filtration capacity. The device includes a sediment chamber having an open upper end. An annular ring is mounted around the perimeter of the upper end of the sediment chamber. The ring is provided with a fluid inlet port for channeling fuel into the chamber. The ring is also formed with a flange that projects radially inwardly, in a manner to define a planar sealing surface.

An elongated cylindrical baffle member is mounted within the sediment chamber. The baffle member is preferably formed integrally with the flange portion of the annular ring. In use, the baffle member functions as an impingement surface to deflect fluids towards the bottom of the sediment chamber. A cartridge member is mounted within the baffle. Preferably, the cartridge member includes a fluted filter element arrayed to define a central channel.

A cap means is provided which is defined by a circular top wall and a generally cylindrical side wall structure. The top wall of the cap includes a fluid outlet port which is in communication with the central channel of the cartridge member. An annular flange is formed integrally with the bottom edge of the side wall of the cap and defines a second planar sealing surface. The cap is mounted to the annular ring with the first and second sealing surfaces being in abutting contact to achieve an improved sealing engagement.

As described more fully hereinbelow, due to the unique construction of the device, the capacity of the filter element is more than twice the capacity of the filter element found in the prior art device. By this arrangement, enhanced separation is achieved while the frequency at which the filter must be replaced is reduced. In the preferred embodiment, the cap includes a recess for receiving the upper portions of the cartridge in a manner to eliminate any gaps or spaces adjacent the top of the device, such that the likelihood of creating an air pocket is substantially reduced.

Further objects and advantages of the subject invention will become apparent from the following detailed description taken in conjunction with the drawings in which:

BRIEF DESCRIPTION OF THE DRAWINGS

FIG. 1 is a cross sectional view of a prior art filter device.

FIG. 2 is a cross sectional view of the new and improved filter device of the subject invention.

BEST MODE FOR CARRYING OUT THE INVENTION

Figure 3:
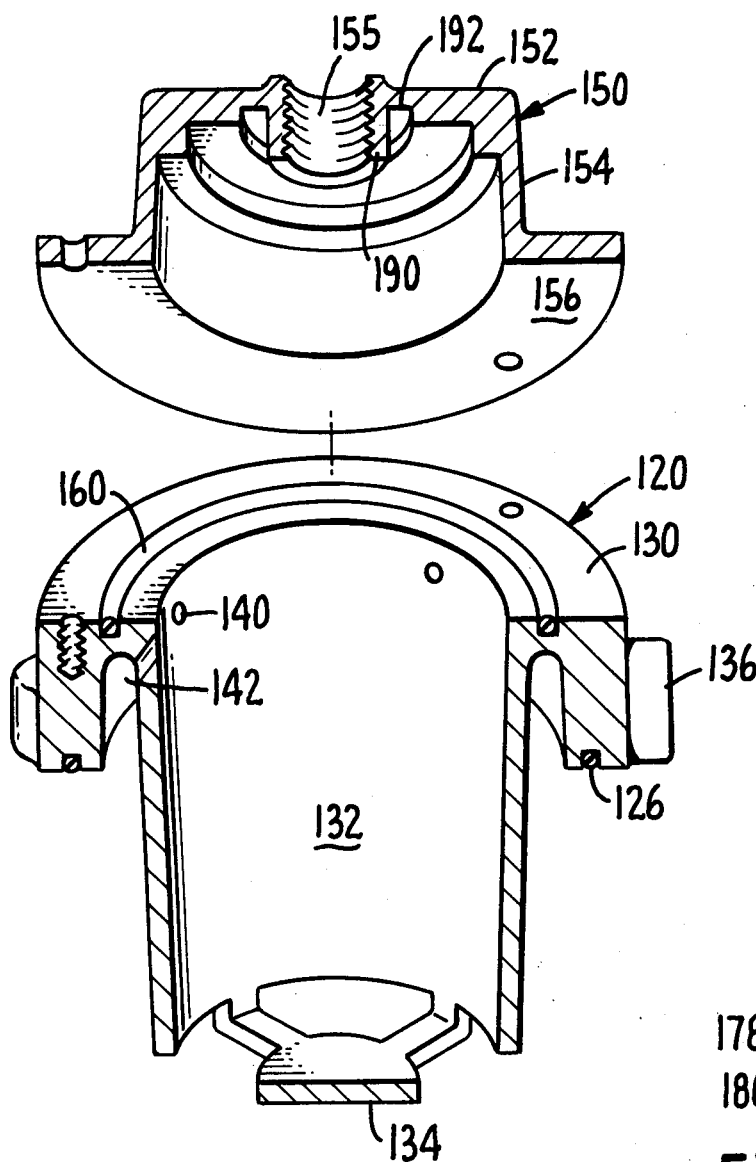
FIG. 3 is a exploded, partial, cross-sectional view of the baffle and cap of the apparatus of the subject invention.

Referring to FIG. 1, there is illustrated a filter apparatus 10 found in the prior art. The prior art filter apparatus 10 has a reduced envelope size such that it may be readily installed in a crowded engine compartment of a passenger type vehicle.

The apparatus 10 includes a sediment chamber 12 having a fluid drain 14. The open upper end of the sediment chamber 12 is formed with a lip 16 which defines a support for a cylindrical baffle 18. More particularly, the baffle 18 is provided with two projecting tangs 20 which rest on the lip 16. As described below, the baffle acts to deflect fluid downwardly into the sediment chamber.

Apparatus 20 further includes an intermediate mounting plate 24 which is secured to the top of the sediment chamber by means of a bracket 26. Plate 24 includes a fluid inlet port 28 and a fluid outlet port 30. The upper portion of plate 24 is formed with a cup-like configuration having a bottom wall 32 and side walls 34. The bottom wall 32 includes a central aperture 36 for receiving a filter cartridge 52. The bottom wall 32 defines a first sealing surface at the area 38 adjacent aperture 36. Plate 24 also includes a second sealing surface at the area 40 located adjacent the upper end of the side walls 34 of the cup-like structure. As discussed immediately hereinbelow, this stepped, bi-level sealing structure contributes to the inherent leakage problem of the prior art device.

The prior art device 10 further includes a cap 42 which is sealingly mounted to plate 24 by means of a bracket 44. Cap 42 includes a conduit 46 having its outlet end in communication with an annular channel 48 defined between the plate 24 and the cap 42. The inlet end of the conduit 46 terminates in a downwardly projecting cylindrical mount 50, which is in communication with the filter cartridge 52.

Filter cartridge 52 includes a filter element 56 arranged to define a central channel 54. In operation, fluids flowing in the sediment chamber pass upwardly into the baffle and enter the filter element. After moving through the filter element, the flow will enter conduit 46 and emerge into the annular channel 48. Fluids in the annular channel are funneled outwardly through port 30, and supplied to the engine.

The above described prior art device has a variety of shortcomings. For example, the cartridge 52 is relatively small and therefore can only accommodate a relatively small filter element 56. Because of its small size, the filter element 56 must be changed frequently and is subject to clogging.

Efforts have been made to increase the amount of filter paper contained within the cartridge in order to increase its usable life. This approach has proved unsuccessful. More particularly, and referring to FIG. 5, it will be seen that fluids entering the outside of the filter element must pass through the paper layers to get to the interior channel of the cartridge. The rate of fluid flow through the filter is in part dependent upon the spacing S between the folds of the flutes of the paper. It has been found that the spacing S between any two folds in a filter should not be reduced below 0.090 inches to insure that fluid flow is maintained.

When attempts were made to increase the amount of paper in the filter element, it was necessary to radially compress the flutes. As can be appreciated, this radial compression will substantially inhibit the fluid flow. In addition, when the flutes are radially compressed, particulates can easily clog the filter which will virtually halt the fluid flow. Thus, there appears to be no known way to increase the filter capacity without increasing the size of the filter cartridge.

A filter cartridge of increased capacity can be readily accommodated merely by enlarging the envelope dimensions of the filter device. However, this an unacceptable solution since the desirable feature of this apparatus is that it can be installed in small engine compartments. As will be seen below, the subject apparatus is provided with a cartridge having at least twice the filter capacity of the prior art cartridge while the small outer envelope dimensions are unchanged.

Another problem associated with the prior art filter device 10 concerns the formation of air pockets. Referring to FIG. 2, it will be seen that filter cartridge 52 is connected to mount 50 of conduit 46 via a resilient grommet 60. This type of mounting is desirable because it enables the filter to be readily replaced. However, the use of grommet 60 causes the top of the cartridge to be spaced away from the bottom of cap 42. The space, which is defined between the cartridge and the cap, creates a gap 62 in which air will be trapped during operation. As pointed out above, if an air pocket is formed, it will often become entrained in the flow of fuel, causing a cough or sputter in the engine. As will be discussed below, the apparatus of the subject invention obviates this shortcoming.

Perhaps the most serious shortcoming of the prior art device relates to leakage problems. More specifically, and as discussed earlier, the cap 42 is sealed at two levels relative to the plate 24. To achieve adequate sealing, the spacing between the upper and lower sealing surfaces of the plate must match the spacing between the upper and lower sealing surfaces of the cap. If there is any variance in the spacing leakage would result.

It has been found that to achieve adequate bi-level sealing, the parts must be manufactured within a very narrow tolerance range, on the order of plus or minus 0.003 inches. This requirement alone is costly, however the situation is further complicated because the parts are typically painted. When dealing with tolerances on the order of a few thousandths of an inch, the thickness of the paint coating is highly critical. Thus, even where the parts have been properly cast, if the paint coating is not uniformly spread out, leakage will result. As will be described immediately hereinbelow, the filter of the subject invention has been designed to obviate this problem. In addition, the improvement in the design of the subject filter not only enhances sealing, but in addition functions to accommodate a cartridge having twice the capacity of the prior art filter.

Referring now to FIGS. 2 and 3, the new and improved filter apparatus 100 of the subject invention will now be discussed. Filter apparatus 100 includes a sediment chamber 112 having an open upper end. Sediment chamber 112 is also provided with a fluid drain 114 for bleeding heavier density fluids. A stopcock 116, shown partially in FIG. 2, may be provided to facilitate the draining of the fluid.

The subject filter 100 includes an annular ring 120 which is sealingly mounted to the top of sediment chamber 112. A lower bracket 122 is provided for installing the unit to the automobile. A plurality of screws 124 are threadably engaged between the bracket 122 and ring 120 for drawing both members into a tight abutting engagement. An O-ring seal 126 may be interposed between the lower edge of the ring and the upper edge of the sediment chamber to enhance the seal.

Ring 120 is provided with a flange portion which projects radially inwardly in a manner to define a first planar sealing surface 130. A generally cylindrical baffle member 132 is located within the sediment chamber. In the preferred embodiment, the cylindrical baffle member 132 is formed integrally with annular ring 120. By manufacturing the baffle and ring as a single unit, a structure of greater strength is produced. The lower end of the baffle member 132 may be provided with a plurality of struts 134, seen more clearly in FIG. 3. Struts 134 aid in maintaining the position of the cartridge during operation.

Annular ring 120 is also provided with a fluid inlet port 136. In use, fluid enters port 136 and is deflected downwardly, towards the bottom of the sediment chamber, by the baffle member 132. Ring 120 is also provided with a plurality of inclined apertures 140 located adjacent the juncture between the flange portion 130 and baffle member 132. The inclined apertures 140 are provided to insure that no air becomes entrapped in the area 142, just below the flange 130. Rather, any air tending to collect in this area will rise upwardly through the inclined apertures to be reentrained in the fluid flow.

In accordance with the subject invention, the filter device 100 is closed by a cap 150. Cap 150 is defined by a circular top wall 152 and a generally cylindrical side wall structure 154. An outlet port 155 is centrally located in the top wall of the cap 150.

In accordance with the subject invention, an annular flange 156 is formed integrally with the lower edge of the cylindrical side wall 154 of the cap. The flange 156 projects radially outwardly from the side wall to define a second planar sealing surface. As illustrated in FIG. 2, cap 150 is mounted to ring 120 in a manner such that the first and second planar surfaces are in abutting contact. As can be appreciated, it is relatively easy to achieve a stable, fluid-tight seal between two opposed planar surfaces. The mounting can be secured by a plurality of screws 158. Preferably, an O-ring seal 160 is interposed between annular ring 120 and cap 150 to enhance the seal.

Figure 5:
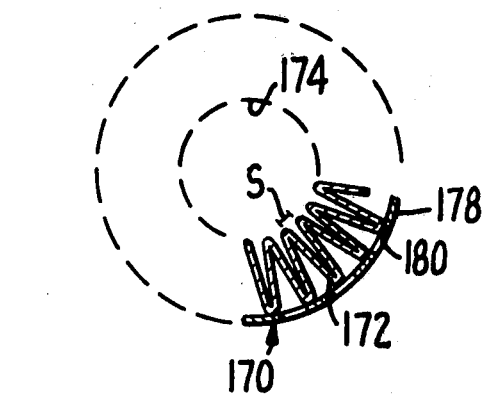
FIG. 5 is a cross sectional view of the filter element taken along the line 5—5 in FIG. 4.
Figure 4:
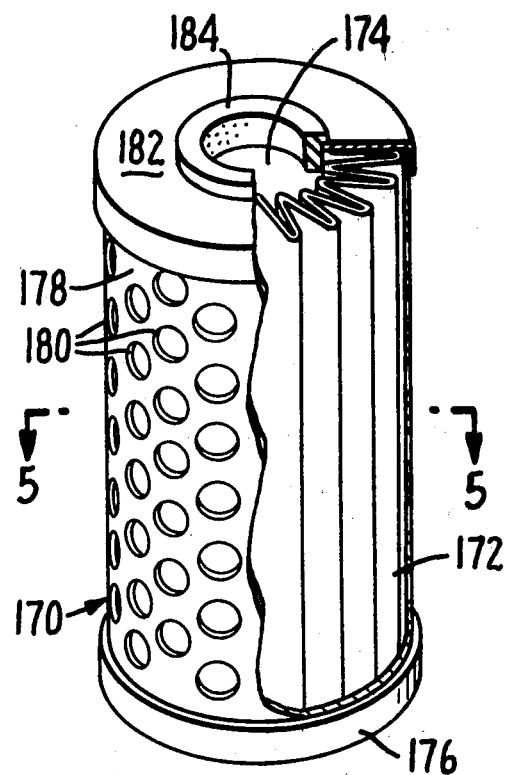
FIG. 4 is a schematic perspective view of the filter element of the subject invention.

As will become apparent from the explanation below, the unique design of the subject housing not only eliminates the sealing problems found in the prior art, but, in addition, permits the use of a replaceable cartridge having a greatly enhanced filter capacity. Referring also to FIG. 4, the subject apparatus 100 includes an elongated, generally cylindrical filter cartridge 170 which is disposed within the sediment chamber 112. Cartridge 170 includes a filter element 172 which is preferably formed from a paper material that is folded into a fluted configuration. As illustrated in FIG. 5, the filter element is folded in a manner to define a central channel 174 which is in communication with the fluid outlet port 156 of cap means 150.

The bottom of cartridge 170 includes a fluid impervious wall 176. Wall 176 is provided to prevent fluids from entering the filter element along its lower surface. As illustrated in FIG. 4, cartridge 170 may also be provided with an outer, metal sheath 178 having a plurality of apertures 180 formed therein. In operation, fluid will enter the filter element through apertures 180.

Cartridge 170 may also be provided with a top wall 182. A resilient grommet 184 is mounted in the top wall 182, in alignment with central channel 174 of the cartridge. The resilient grommet 184 is provided to permit the cartridge 170 to be removably connected to the inwardly projecting mount 190 of inlet port 156.

In the preferred embodiment, top wall 152 of cap 150 is provided with a stepped recess 192, shown in greater detail in FIG. 3. The stepped recess 192 is adapted to abuttingly receive the grommet 184 and the top wall of cartridge 170. By this arrangement, and as illustrated in FIG. 2, the entire upper surface of the cartridge is contiguous with the top wall of the cap, thereby eliminating any gaps therebetween. As discussed above, in the prior art device, the presence of any gaps adjacent the top of the device often results in the formation of an air pocket during operation. When this air pocket is suddenly entrained into the fuel flow, engine performance suffers. Thus, by eliminating the gap between the filter and the cap, the likelihood of the formation of an air pocket is substantially diminished.

By comparing FIGS. 1 and 2, it will be readily apparent that while the outer housing of both devices are relatively the same size, the filter cartridge in the subject invention is significantly larger than the cartridge found in the prior art. This result is due primarily to two factors. The first factor is that the annular channel 48, utilized in the prior art device to move fluid from the cartridge to the outlet port, has been eliminated. By eliminating the annular channel, the diameter of opening 36, which receives the cartridge, can be increased. Since the diameter of opening 36 has been increased, the diameter of the cartridge can be correspondingly increased.

The second factor relates to the total redesign of the sealing structure. More particularly, the new cap design permits the height of the filter cartridge to be increased. By increasing both the diameter and the height of the filter cartridge, the capacity of the filter element is more than doubled. The increased capacity permits the filter element to function more efficiently, for longer periods of time, thereby reducing the need for frequent replacement. The increased size of the cartridge is achieved without reducing the expansion area in the sediment chamber. Further, even though there is an increase in filter capacity, the desired radial spacing S between the folds of the paper is maintained, thereby insuring maximum fluid flow.

To replace the cartridge 170, the user merely has to disconnect the cap from the ring 120 and lift the cartridge out of the chamber. The resilient grommet allows the spent cartridge to be discarded and a new cartridge to be readily attached to the cap. When reconnecting the cap, the opposed planar sealing surfaces are rejoined to establish a leakproof connection.

Having described the elements of the improved filter apparatus 100, its operation will now be discussed. In use, fluid is injected into the inlet port 136 formed in ring 120. Baffle member 132 functions to deflect the flow downwardly, towards the bottom of the sediment chamber. The fluid flow will typically tend to circulate in the lower part of the chamber, as well as between the side walls of the baffle and the inner wall of the chamber. The impingement of the fluids on the side wall of the sediment chamber and the baffle member 132 aids in separating the water from the diesel fuel flow. The water will eventually collect adjacent the bottom of the sediment chamber where it can be drained through stopcock 116.

The fluid flow is then be channeled upwardly, between struts 134, into a channel defined between the side wall of the cartridge 170 and the inner surface of the baffle member 132. The fluid is prevented from entering the bottom of the filter by fluid-impervious wall 176. Therefore, the fluid flow will enter the filter element through apertures 180 in the sheath surrounding the cartridge. As the fluid migrates through the filter towards the central channel 174, additional water will be removed, as well as any particulates in the flow. After the fluid has entered the central channel, it will exit the filter through outlet port 155.

In summary, there has been provided a new and improved filter apparatus 100 for separating low density fluids from high density fluids. The apparatus has a relatively small envelope size and is particularly suited for use with passenger vehicles having a crowded engine compartment. The subject apparatus includes an annular ring 120 which is sealingly mounted about the perimeter of a sediment chamber 112. The annular ring has an inwardly projecting flange which defines a first sealing surface 130. A cylindrical baffle member 132 is disposed within the sediment chamber and is preferably formed integrally with annular ring 120. A cap means 150, having a circular top wall 152 and a cylindrical side wall structure 154 is mounted to the annular ring. The cap means includes an outwardly projecting flange 156 that defines a second sealing surface which is mounted in abutting contact with the first sealing surface of the annular ring. The new and improved design of the subject filter substantially eliminates the sealing problems found in the prior art. In addition, the new design also includes a filter cartridge having a substantially increased capacity.

While the subject invention has been described with reference to a preferred embodiment, it is to be understood that various other changes and modifications could be made therein, by one skilled in the art, without varying from the scope and spirit of the subject invention as defined by the appended claims.

I claim:

1. An apparatus for separating low density fluids from high density fluids comprising:

a sediment chamber having an open upper end;

an annular ring, sealingly mounted about the perimeter of said open upper end of said sediment chamber, said annular ring having a fluid inlet port formed therein and with the upper end of said ring being formed with an annular flange projecting radially inwardly such that the upper surface of said ring defines a first planar sealing surface;

an elongated cylindrical baffle member disposed within said sediment chamber, with the upper end of said baffle member being connected to the inner edge of the flange of said annular ring;

cap means having a circular top wall and a generally cylindrical side wall structure extending downwardly from said top wall, with said top wall being generally planar and including opposed upper and lower surfaces, said top wall further including a fluid outlet port extending therethrough, and with the lower edge of said side wall structure including an annular flange projecting radially outwardly to define a second planar sealing surface, said cap means being mounted to said annular ring with said first and second sealing surfaces being in abutting contact to define a full sealing engagement; and an elongated cartridge member having a filter element formed therein, with the lower portion of said cartridge member being disposed within said cylindrical baffle member and with the upper portion of said cartridge member extending upwardly above both said fluid inlet port and the upper edge of said baffle member and terminating adjacent said lower surface of said top wall of said cap means, said filter element being in communication with the fluid outlet port formed in said cap means whereby fluid entering said apparatus through said inlet port is deflected downwardly by said baffle member, and with said fluid being redirected upwardly, enabling it to enter said cartridge member and pass therethrough, exiting said apparatus via said outlet port.

2. An apparatus as recited in claim 1 further including an O-ring seal interposed between said first and second planar sealing surfaces.

3. An apparatus as recited in claim 1 wherein the upper surface of said cartridge member includes a resilient mounting grommet and wherein the lower inner surface of the top wall of said cap means includes a downwardly projecting cylindrical support, with said gromment being removably mounted over said support.

4. An apparatus as recited in claim 3 wherein the lower surface of the top wall of said cap means includes a recess for receiving said grommet such that the upper surface of said cartridge member may be mounted in abutting contact with the lower surface of said top wall to reduce the likelihood of the formation of an air pocket therebetween.

5. An apparatus as recited in claim 1 wherein said filter element consists of a paper material folded in a fluted pattern.

6. An apparatus as recited in claim 5 wherein said filter element is folded in a manner to define a central channel, the upper end of said channel being in communication with the outlet port of said cap means.

7. An apparatus as recited in claim 1 wherein said cartridge member further includes a cylindrical sheath mounted about said filter element, said sheath having a plurality of apertures formed therein to permit the fluid to flow therethrough.

8. An apparatus as recited in claim 7 wherein said cartridge member includes a fluid impervious bottom wall such that fluid may enter said cartridge member only through the apertures in said sheath.

9. An apparatus as recited in claim 1 wherein the lower edge of said cylindrical baffle includes a plurality of support struts to aid in maintaining the position of said cartridge member within said apparatus.

10. An apparatus as recited in claim 1 wherein said cylindrical baffle includes a plurality of inclined air vents extending therethrough and being located adjacent said flange of said annular ring, said air vents for preventing an air pocket from forming adjacent said annular ring.

11. An apparatus as recited in claim 1 wherein the bottom end of said sediment chamber is provided with a fluid drain means for removing the fluids of heavier density.

12. An apparatus for separating low density fluids from high density fluids comprising:

a sediment chamber having an open upper end;

an annular ring, sealingly mounted about the perimeter of said open upper end of said sediment chamber, said annular ring having a fluid inlet port formed therein and with the upper end of said ring being formed with an annular flange projecting radially inwardly such that the upper surface of said ring defines a first planar sealing surface;

an elongated cylindrical baffle member disposed within said sediment chamber, with the upper end of said baffle member being connected to the inner edge of the flange of said annular ring;

cap means having a circular top wall and a generally cylindrical side wall structure extending downwardly from said top wall, with said top wall being generally planar and including opposed upper and lower surfaces, said top wall further including a fluid outlet port extending therethrough and terminating in a downwardly projecting cylindrical support, with the lower surface of said top cap further including a recess disposed about said support and with the lower edge of said side wall structure including an annular flange projecting radially outwardly to define a second planar sealing surface, said cap means being mounted to said annular ring with said first and second sealing surfaces being in abutting contact to define a full sealing engagement; and an elongated cartridge member having a filter element formed therein, with the lower portion of said cartridge member being disposed within said cylindrical baffle member, and with the upper end of said cartridge member including a resilient grommet adapted to be removably mounted over the support of said cap means, and with a portion of said grommet being received in the associated recess in the top cap, enabling the upper surface of said cartridge member to be mounted in abutting contact with said lower surface of said top wall, said filter element being in communication with the fluid outlet port formed in said cap means whereby fluid entering said apparatus through said inlet port is deflected downwardly by said baffle member, and with said fluid being redirected upwardly, enabling it to enter said cartridge member and pass therethrough, exiting said apparatus via said outlet port.

13. An apparatus as recited in claim 12 wherein said cylindrical baffle includes a plurality of inclined air vents extending therethrough and being located adjacent said flange of said annular ring, said air vents for preventing an air pocket from forming adjacent said annular ring.

* * * * *